US010618548B2

(12) United States Patent
Shimokawabe et al.

(10) Patent No.: US 10,618,548 B2
(45) Date of Patent: Apr. 14, 2020

(54) ELECTRIC POWER STEERING APPARATUS

(71) Applicant: NSK Ltd., Tokyo (JP)

(72) Inventors: Satoshi Shimokawabe, Maebashi (JP); Tetsuya Kitazume, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 15/740,578

(22) PCT Filed: Aug. 7, 2017

(86) PCT No.: PCT/JP2017/028610
§ 371 (c)(1),
(2) Date: Dec. 28, 2017

(87) PCT Pub. No.: WO2018/142650
PCT Pub. Date: Aug. 9, 2018

(65) Prior Publication Data
US 2019/0359251 A1 Nov. 28, 2019

(30) Foreign Application Priority Data

Feb. 2, 2017 (JP) .................................. 2017-017384

(51) Int. Cl.
*B62D 5/04* (2006.01)
(52) U.S. Cl.
CPC .................. *B62D 5/0466* (2013.01)
(58) Field of Classification Search
CPC ............................. B62D 5/0466; B62D 6/008
USPC ....................................................... 701/41
See application file for complete search history.

(56) References Cited

U.S. PATENT DOCUMENTS

2009/0271069 A1* 10/2009 Yamamoto ........... B62D 5/0466
701/41

FOREIGN PATENT DOCUMENTS

| EP | 3025932 A1 | 6/2016 |
|----|------------|--------|
| JP | 2003-072573 A | 3/2003 |
| JP | 2003-175850 A | 6/2003 |
| JP | 4685557 B2 | 5/2011 |
| JP | 2012-218498 A | 11/2012 |
| JP | 2017-007663 A | 1/2017 |
| JP | 2017-013625 A | 1/2017 |
| WO | 2014/167631 A1 | 10/2014 |

OTHER PUBLICATIONS

Written Opinion of PCT/JP2017/028610 dated Oct. 10, 2017 [PCT/ISA/237].

* cited by examiner

*Primary Examiner* — Marthe Y Marc-Coleman
(74) *Attorney, Agent, or Firm* — Sughrue Mion, PLLC (57) ABSTRACT

An electric power steering apparatus that includes a function to perform a handle-returning control being consistent with an intention of a driver by using, for a calculation of a target steering angular velocity, only a steering input due to the intention of the driver which is included in a steering torque and the assist current or only vehicle motion characteristics based on the steering input, in the handle-returning control which performs a PID-control depending on a deviation between the target steering angular velocity and a steering angular velocity.

4 Claims, 8 Drawing Sheets

FIG.1

PRIOR ART

ELECTRIC POWER STEERING APPARATUS

CROSS REFERENCE TO RELATED APPLICATIONS

This application is a National Stage of International Application No. PCT/JP2017/028610, filed Aug. 7, 2017, claiming priority based on Japanese Patent Application No. 2017-017384, filed Feb. 2, 2017, the contents of all of which are incorporated herein by reference in their entirety.

TECHNICAL FIELD

The present invention relates to an electric power steering apparatus that applies an assist torque to a steering system by pulse-width-modulation-controlling (PWM-controlling) a motor by means of an inverter based on a current command value. In particular, the present invention relates to the electric power steering apparatus has a function to perform a handle-returning control being consistent with an intention of a driver by using, for a calculation of a target steering angular velocity, only a steering input due to the intention of the driver which is included in a steering torque and the assist torque (the current command value) or only vehicle motion characteristics based on the steering input, in the handle-returning control which performs a proportional-integral-differential control (PID-control) and so on depending on a deviation between the target steering angular velocity and a steering angular velocity.

BACKGROUND ART

An electric power steering apparatus (EPS) which provides a steering mechanism of a vehicle with an assist torque by means of a rotational torque of a motor, applies a driving force of the motor as a steering assist torque to a steering shaft or a rack shaft by means of a transmission mechanism such as gears or a belt through a reduction mechanism. In order to accurately generate the assist torque, such a conventional electric power steering apparatus (EPS) performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

Figure 1:
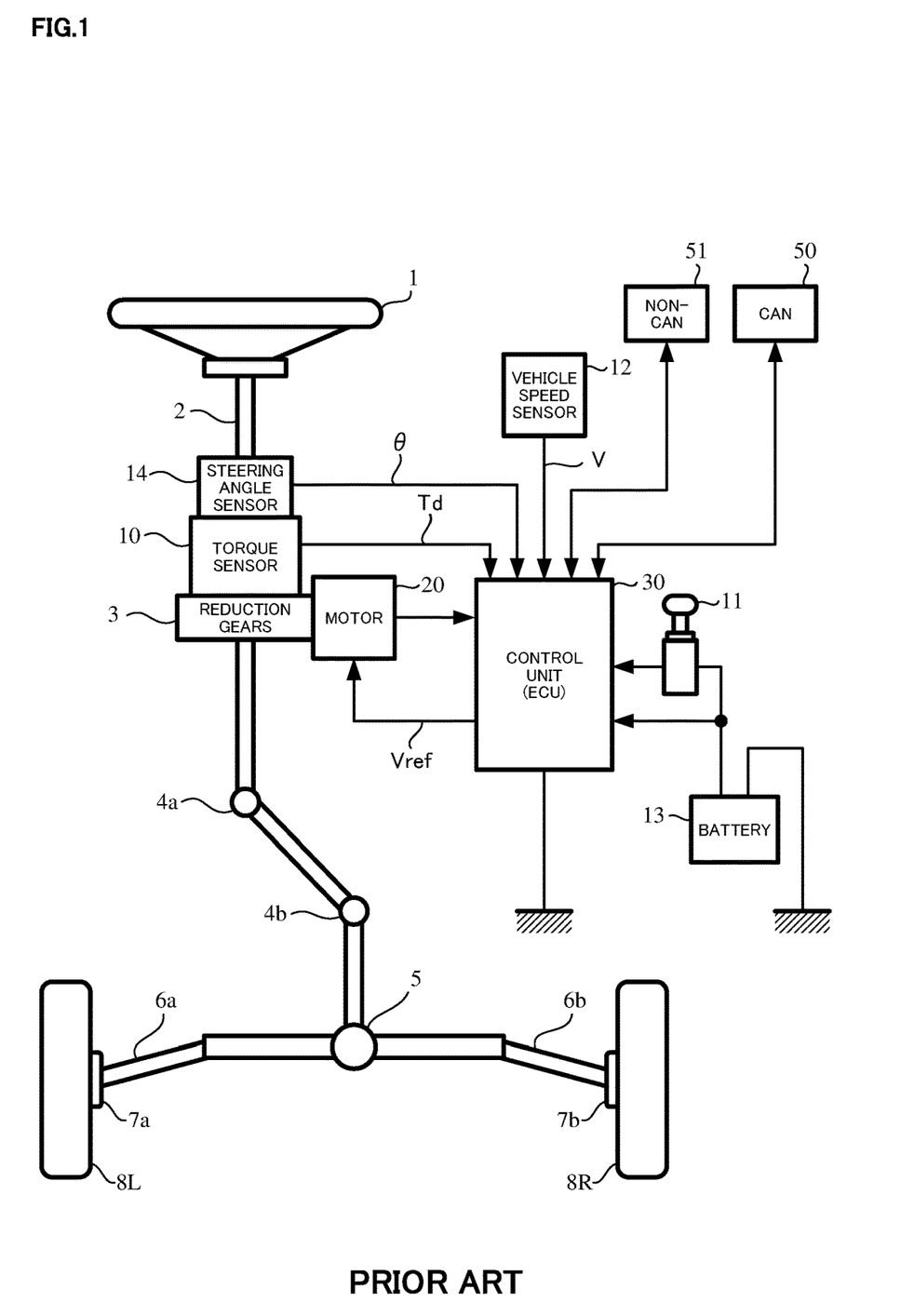
FIG. 1 is a configuration diagram showing a general outline of an electric power steering apparatus.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Td of the steering wheel 1 and a steering angle sensor 14 for detecting a steering angle θ, and the motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of the steering torque Td detected by the torque sensor 10 and a vehicle speed V detected by a vehicle speed sensor 12, and controls a current supplied to the motor 20 by means of a voltage control command value Vref obtained by performing compensation or the like to the current command value. A steering angle sensor 14 is not indispensable and may not be provided.

A controller area network (CAN) 50 to send/receive various information and signals on the vehicle is connected to the control unit 30, and it is also possible to receive the vehicle speed V from the CAN 50. Further, a Non-CAN 51 is also possible to connect to the control unit 30, and the Non-CAN 51 sends and receives a communication, analogue/digital signals, electric wave or the like except for the CAN 50.

Figure 2:
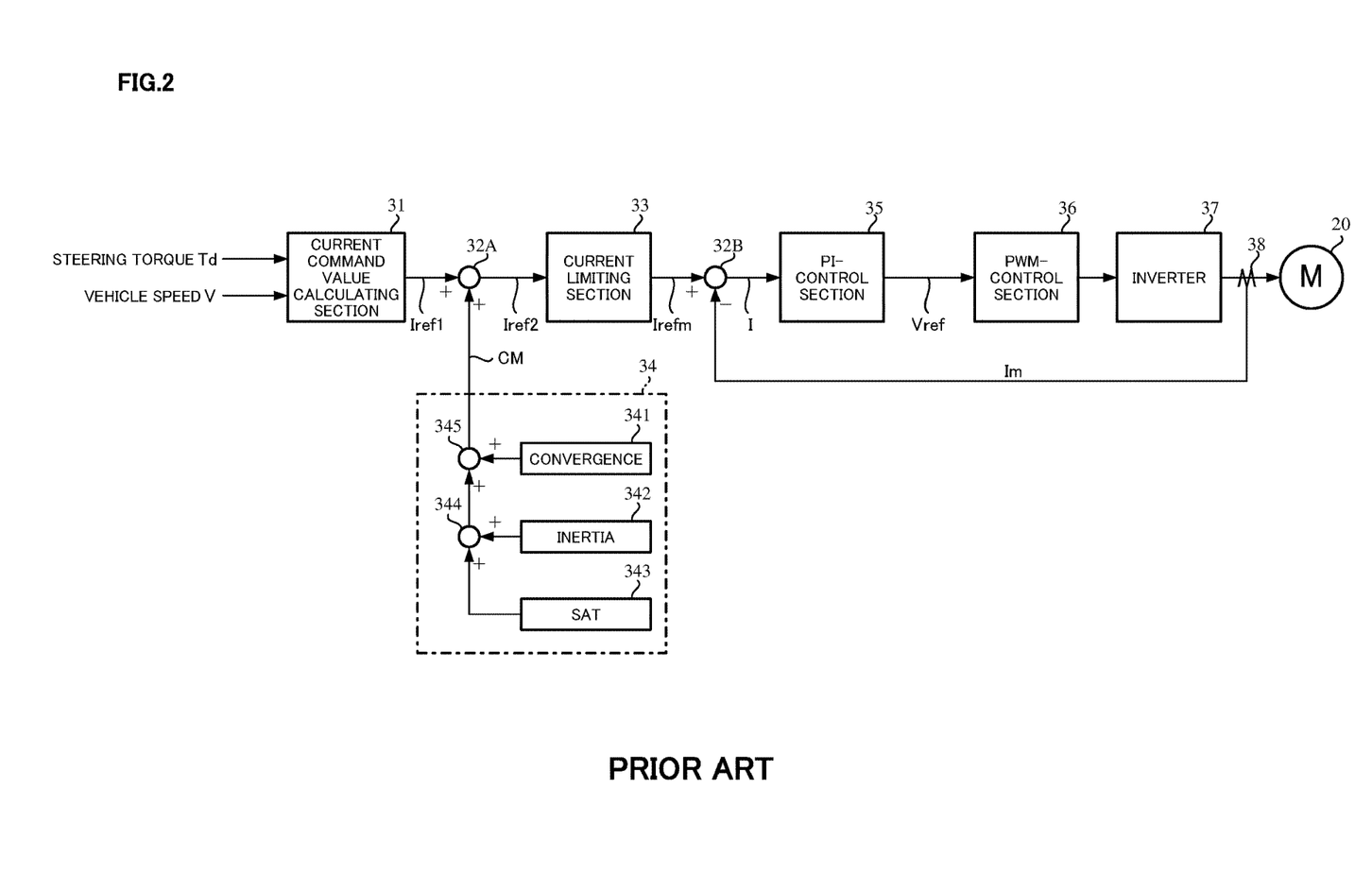
FIG. 2 is a block diagram showing a configuration example of an electric power steering apparatus.

The control unit 30 mainly comprises a central processing unit (CPU) (including a micro controller unit (MCU) and a micro processing unit (MPU)), and general functions performed by programs within the CPU are, for example, shown in FIG. 2.

Functions and operations of the control unit 30 will be described with reference to FIG. 2. As shown in FIG. 2, the steering torque Td detected by the torque sensor 10 and the vehicle speed V detected by the vehicle speed sensor 12 (or from the CAN 50) are inputted into a current command value calculating section 31 which calculates the current command value Iref1. The current command value calculating section 31 calculates the current command value Iref1, based on the steering torque Td and the vehicle speed V with reference to an assist map or the like, which is a control target value of a current supplied to the motor 20. The calculated current command value Iref1 is inputted into a current limiting section 33 via an adding section 32A, and the current command value Irefm whose maximum current is limited is inputted into a subtracting section 32B. A deviation I (=Irefm−Im) between the current command value Irefm and a motor current value Im which is fed-back is calculated at the subtracting section 32B, and the deviation I is inputted into a proportional-integral-control (PI-control) section 35 for improving a current characteristic of the steering operation. The voltage control command value Vref that the characteristic is improved at the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. An FET is used as a driving device at the inverter 37, and the inverter 37 is constituted by a bridge circuit of the FET.

A compensation signal CM from a compensation signal generating section 34 is added at the adding section 32A. A characteristic compensation of the steering system is performed by adding the compensation signal CM, and a convergence, an inertia characteristic, and the like are improved. The compensation signal generating section 34 adds a self-aligning torque (SAT) 343 to an inertia 342 at an adding section 344. The adding result is further added with a convergence 341 at an adding section 345. The adding result at the adding section 345 is treated as the compensation signal CM.

In such an electric power steering apparatus, friction due to the reduction gears and the rack-and-pinion is large, and an equivalent inertia moment around the steering shaft due to the motor in order to generate the assist torque is large. Thereby, in a low vehicle speed range that the self-aligning torque (SAT) is small, the handle-returning is not adequate since the friction is larger than the SAT. Since the steering angle is not returned to a neutral position by only the SAT in a straight running state, it is necessary to return the steering angle to the neutral position by means of a steering intervention by a driver, and this is a burden on the driver.

On the other hand, since the SAT is also large in a high vehicle speed range that the SAT is large, the steering angular velocity of the handle-returning tends to be fast in comparison with the low vehicle speed due to the large SAT. However, an inertia torque is also large since the inertia moment is large. Consequently, the handle is not converged at the neutral position of the steering angle and is overshot, and therefore the vehicle characteristics are felt unstable.

Thus, it is necessary to assist the handle-returning in the low vehicle speed and to enhance the convergence in order to stabilize the vehicle characteristics in the high vehicle speed. In order to achieve the above requirements, various control methods, which perform an appropriate assist when returning the handle, are proposed. In those handle-returning controls, the electric power steering apparatus as a prior art whose object is to perform the smooth handle-returning control even in the steering intervention by the driver is disclosed in Japanese Patent No. 4685557 B2 (Patent Document 1).

In the apparatus of Patent Document 1, a controller constituted so as to follow the target steering angular velocity calculates the target steering angular velocity by performing a correction, for a base target steering angular velocity, by using a multiplication and an addition based on the vehicle speed and the steering torque. In the steering intervention by the driver, uncomfortable feeling for the driver when the driver steers the handle, is reduced by correcting the target steering angular velocity to a direction which the steering torque is applied.

THE LIST OF PRIOR ART DOCUMENTS

Patent Documents

Patent Document 1: Japanese Patent No. 4685557 B2

SUMMARY OF THE INVENTION

Problems to be Solved by the Invention

In order to realize the smooth handle-returning in hands off state, it is preferred that a steering angular acceleration does not largely vary and the steering angular velocity becomes zero at the neutral position of the steering position. However, in the apparatus according to Patent Document 1, although the correction due to the steering torque is performed when the target steering angular velocity is set, the correction due to the assist torque is not performed. Generally, the higher the vehicle speed is, the smaller the assist torque is set. Therefore, in the corrections due to the steering torque and the vehicle speed, there is a problem that a calculation of a preferable correction amount takes time. Further, in a case that the excessive value is set, the handle-returning control is excessively operated, and then the driver feels uncomfortable.

The present invention has been developed in view of the above-described circumstances, and an object of the present invention is to provide the electric power steering apparatus that comprises a function to perform a handle-returning control being consistent with an intention of a driver by using, for a calculation of a target steering angular velocity, only a steering input due to the intention of the driver which is included in a steering torque and the assist current or only vehicle motion characteristics based on the steering input, in the handle-returning control which performs a PID-control and so on depending on a deviation between the target steering angular velocity and a steering angular velocity.

Means for Solving the Problems

The present invention relates to an electric power steering apparatus that calculates a current command value based on at least a steering torque, drives a motor based on the current command value and assist-controls a steering system by means of driving-control of the motor, the above-described object of the present invention is achieved by that comprising: a handle-returning control section which calculates a target steering angular velocity for a handle-returning by using the steering torque, the current command value, a vehicle speed and a steering angle, and calculates a handle-returning control current based on a deviation between a steering angular velocity and the target steering angular velocity; and interposes a filter, which attenuates frequency components which are equal to or higher than a steering input or which are equal to or higher than vehicle motion characteristics based on the steering input, in a calculation path of the target steering angular velocity, wherein the motor is driven by correcting the current command value by means of the handle-returning control current.

The above-described object of the present invention is efficiently achieved by that: wherein the handle-returning control section comprises: a target returning velocity calculating section to calculate a target returning velocity based on the steering angle and the vehicle speed; a steering torque gain section to calculate a steering torque gain based on the steering torque; a viscosity coefficient outputting section to calculate a viscosity coefficient C of the steering system based on the vehicle speed; a vehicle speed gain section to calculate a vehicle speed gain based on the vehicle speed; a first steering system characteristic section to calculate a first target velocity value from an adding value of the steering torque and an assist torque which is a value being multiplied the current command value by a gain and the viscosity coefficient C; the filter to filter-process the first target velocity value; a second steering system characteristic section to input a third target velocity value which is obtained by correcting the target returning velocity with a second target velocity value from the filter, and to calculate the target steering angular velocity from the viscosity coefficient C and an inertia moment J of the steering system; a handle-returning control gain calculating section to calculate a handle-returning control gain by multiplying a deviation between the target steering angular velocity and the steering angular velocity with the vehicle speed gain and the steering torque gain; and a handle-returning control current calculating section to calculate a handle-returning control current by performing at least one control calculation of a proportional control calculation, an integral control calculation and a differential control calculation to the handle-returning control gain, and output-limiting the calculated handle-returning control gain by means of the vehicle speed gain and the steering torque gain; or wherein the filter is a low pass filter (LPF) and a filter characteristic has an attenuation which is equal to or more than 3 [dB] at 10 [Hz].

Effects of the Invention

According to the electric power steering apparatus of the present invention, since a virtual inertia moment and a virtual viscosity coefficient can be set in a simple virtual vehicle model, even in a case that the apparatus has the un-preferable inertia moment and the un-preferable viscosity coefficient as the steering system characteristics, it is possible to approximate to the virtual inertia moment and the virtual viscosity coefficient by calculating the target steering angular velocity with the virtual steering system model and by performing the feedback-control. By not strongly reflecting unintentional components for the driver such as a road surface disturbance on the calculating value of the target steering angular velocity, it is possible to realize the handle-returning control which is consistently operated with the intention of the driver.

MODE FOR CARRYING OUT THE INVENTION

In an electric power steering apparatus, an operation is prevented by friction of reduction gears and a rack-and-pinion for transferring an assist torque, a handle does not return to a neutral position in spite of a running state to be returned to a straight running state and then it can be difficult for a vehicle to become the straight running state. In this connection, by correcting (compensating) a current command value by means of a handle-returning control current depending on the steering angle and the vehicle speed, it is possible to actively return the handle to the neutral position when the running state is returned to the straight running state.

The present invention defines a target returning velocity depending on a steering angle and a vehicle speed, adds a target velocity value calculated from a steering torque being applied to a column shaft and an assist torque (a current command value) to the target returning velocity, and calculates a target steering angular velocity by multiplying the added result with a transfer characteristic depending on a virtual steering system characteristic. The present invention further performs at least one control of a proportional control (P-control), an integral control (I-control) and a differential control (D-control) against a deviation between the target steering angular velocity and an actual steering angular velocity. By performing a feedback control with the target steering angular velocity that is calculated by correcting the target returning velocity by using the target velocity value calculated by dividing the steering torque and the assist torque (the current command value) with a viscosity coefficient, it is possible to realize a handle-returning control that a driver feels natural feeling even at a time of a steering intervention by the driver.

The present invention relates to the electric power steering apparatus (EPS) that calculates an assist torque (a steering shaft torque) by using the steering torque and the current command value (an assist current) and applies a handle-returning control current due to a deviation between the target steering angular velocity and the actual steering angular velocity. The present invention cuts noise components which the EPS has and a vibration due to a resonance, unnecessary road noise components, a torque variation which the driver does not intend, a vehicle variation and the like, and provides a smoother handle-returning performance by interposing a low pass filter (LPF) in a path which the target steering angular velocity is calculated from the assist torque (the steering shaft torque) so as to attenuate frequencies (10 [Hz]~) which are equal to or higher than a steering input which the driver mainly intends, or which are equal to or higher than vehicle motion characteristics based on the steering input.

A simple virtual vehicle model in the present invention is a model that calculates the target steering angular velocity $\omega_0$ by applying a steering system transfer function depending on a virtual inertia moment J and a virtual viscosity coefficient C of the steering system to a sum of the target returning velocity $\omega t$ ($-\omega t$), which is calculated from the steering angle $\theta$ and the vehicle speed V, the steering torque Td and the assist torque Ta.

Since the virtual inertia moment J and the virtual viscosity coefficient C of the steering system can be set by using the virtual vehicle model, it is possible to determine vehicle characteristics, arbitrarily. Further, since the steering intervention by the driver, which is also taken into account for the assist torque Ta in the virtual vehicle model, is considered, the smooth handle-returning can be provided even in a state that the driver steers the handle.

Here, assuming that static friction, Coulomb friction and an elastic term are not existed in the steering system, an Equation of a force balance among a self-aligning torque SAT, the steering torque Td and the assist torque Ta is represented by a below Equation 1.

$$SAT + T_d + T_a = J\frac{d^2\theta}{dt^2} + C\frac{d\theta}{dt} \qquad \text{[Equation 1]}$$

Here, "J" is the inertia moment of the virtual steering system and "C" is the viscosity coefficient of the virtual steering system.

Since the actual steering angular velocity $\omega$ is a time differential of the steering angle $\theta$, a following Equation 2 is satisfied.

$$\omega = d\theta/dt \qquad \text{[Equation 2]}$$

Then, the target steering angular velocity is set to "$\omega_0$".

$$SAT + T_d + T_a = J\frac{d\omega_0}{dt} + C\omega_0 \qquad \text{[Equation 3]}$$

The above Equation 3 is satisfied, "s" is set to Laplace operator and a following Equation 4 is obtained. By rearranging the Equation 4, a following Equation 5 is obtained.

$$SAT + T_d + T_a = sJ\omega_0 + C\omega_0 \qquad \text{[Equation 4]}$$

$$SAT + T_d + T_a = (sJ + C)\omega_0 \quad \text{[Equation 5]}$$

Then, the target steering angular velocity $\omega_0$ is represented by the above Equation 5.

$$\omega_0 = \frac{SAT + T_d + T_a}{sJ + C} \quad \text{[Equation 6]}$$

By rearranging the Equation 6, a following Equation 7 is obtained.

$$\omega_0 = \frac{1}{\frac{J}{C}s + 1}\left(\frac{SAT}{C} + \frac{T_d + T_a}{C}\right) \quad \text{[Equation 7]}$$

The target steering angular velocity $\omega_0$ is calculated by the above Equation 7. Here, "SAT/C" is the steering angular velocity generated by the self-aligning torque SAT, and it can be considered that "SAT/C" is set as returning steering angular velocity depending on the vehicle characteristics.

$$\frac{1}{\frac{J}{C}s + 1} \quad \text{[Equation 8]}$$

An Equation 8 represents the transfer characteristic calculated from the virtual vehicle model.

$$\frac{T_d + T_a}{C} \quad \text{[Equation 9]}$$

An Equation 9 represents the steering angular velocity generated by the steering torque Td and the assist torque Ta.

Since the self-aligning torque SAT is generally determined based on the steering angle θ and the vehicle speed V, the returning steering angular velocity can be set depending on the vehicle speed V and the steering angle θ. Further, the steering torque Td can be detected by a torque sensor and the assist torque Ta can be calculated by considering a motor torque constant Kt from the current command value. In this connection, the steering angular velocity, which is generated due to the steering torque Td and the assist torque Ta, is calculated by dividing a sum of the steering torque Td and the assist torque Ta by the viscosity coefficient C of the virtual steering. By adding a term of SAT to a term of the steering angular velocity, the target steering angular velocity $\omega_0$ is obtained.

Although the steering torque Td and the assist torque Ta include variation components and so on due to the road surface disturbance, these are not derived from the intention of the driver. When these are reflected on the target steering angular velocity $\omega_0$, the behavior of the vehicle can be out of harmony with the intention of the driver and the driver may feel uncomfortable.

Accordingly, in the present invention, a filter (LPF), which attenuates frequency components which are higher than a steering input which the driver intends, or which are higher than vehicle motion characteristics (yaw, roll and the like) based on the steering input, is provided at a rear stage of the target velocity value $\omega_1$ calculated from the steering torque Td and the assist torque Ta, and thereby a stable control, a smooth returning and a steering feeling consistent with the intention of the driver are realized. Generally, since it is considered that a steering frequency of the driver and the vehicle motion by the steering of the driver are up to about 10 [Hz], the filter has an attenuation characteristic that reduces 3 [dB] or more from the gain "0" at 10 [Hz] as a filter characteristic.

Embodiments according to the present invention will be described with reference to the drawings.

Figure 3:
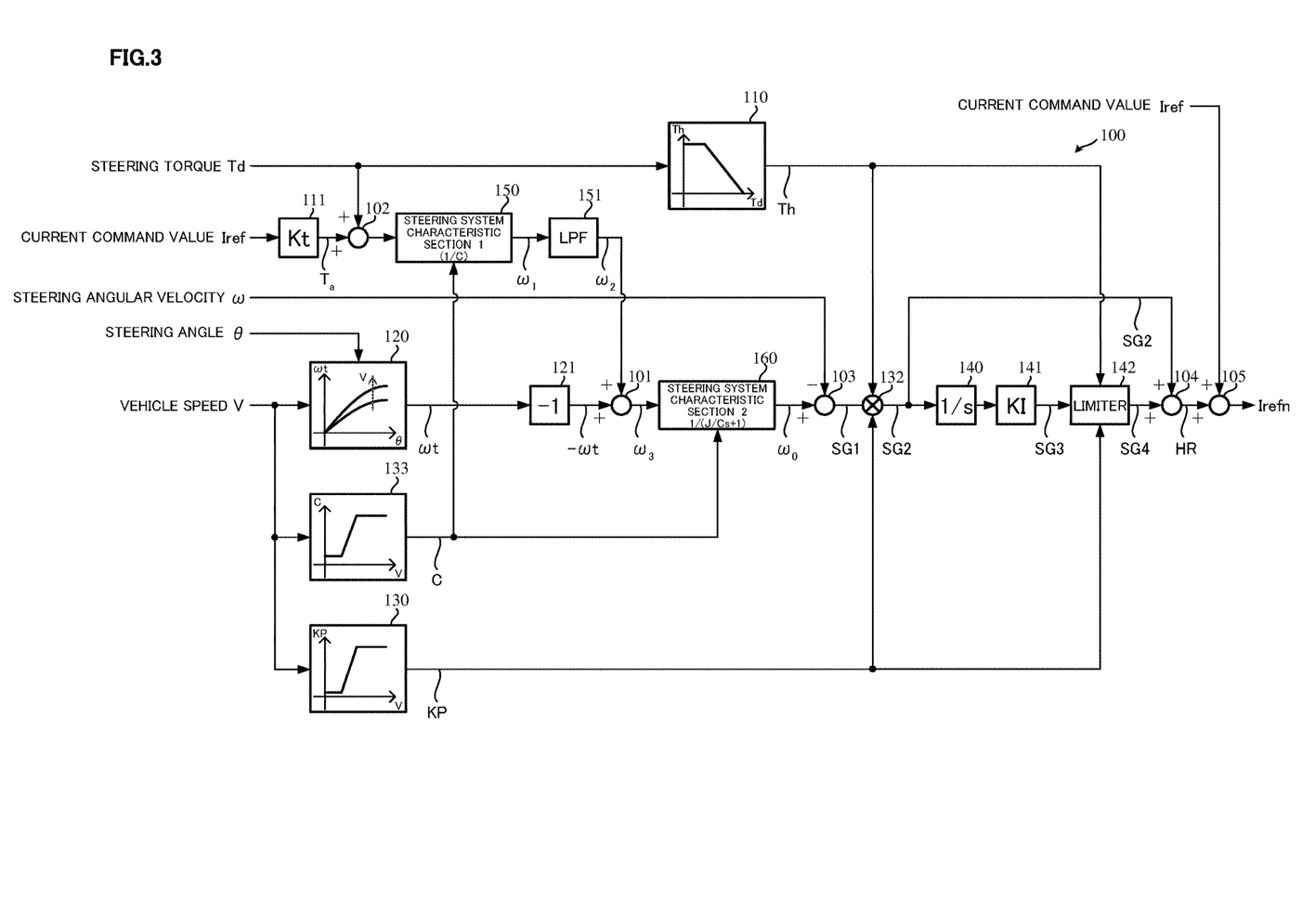
FIG. 3 is a block diagram showing a configuration example of the present invention.

FIG. 3 shows a configuration example of a handle-returning control section 100 according to the present invention. The steering torque Td is inputted into a steering torque gain section 110 that outputs a steering torque gain Th and an adding section 102, and the steering angle θ is inputted into a target returning velocity calculating section 120 that calculates the target returning velocity ωt. Further, the vehicle speed V is inputted into the target returning velocity calculating section 120, a vehicle speed gain section 130 that outputs a vehicle speed gain KP and a viscosity coefficient outputting section 133 that outputs the viscosity coefficient C. The actual steering angular velocity A is subtracting-inputted into a subtracting section 103. The current command value Iref is gain-Kt-multiplied at a gain section 111, and an output being a multiplied result is inputted into the adding section 102 as the assist torque Ta. Accordingly, an adding result of the adding section 102 is a sum of the steering torque Td and the assist torque Ta, and the sum value is inputted into a steering system characteristic section 150 that has a transfer function "1/C". The target velocity value $\omega_1$ from the steering system characteristic section 150 is inputted into the low pass filter (LPF) 151, and the frequencies (10 [Hz]~) which are equal to or higher than the steering input of the driver, or which are equal to or higher than the vehicle motion characteristics based on the steering input are attenuated at the LPF 151. Then, the target velocity value $\omega_2$ whose frequencies are attenuated is inputted into an adding section 101.

The target returning velocity ωt that is calculated at the target returning velocity calculating section 120 based on the steering angle θ and the vehicle speed V, is inverted (−ωt) a sign at an inverting section 121 and an inverted target returning velocity "−ωt" is inputted into an adding section 101. A target velocity value $\omega_3$ that is an added result at the adding section 101 is inputted into a steering system characteristic section 160 that has a transfer function "1/(J/Cs+1)". The viscosity coefficient C from the viscosity coefficient outputting section 133 is inputted into the steering system characteristic sections 150 and 160. The steering system characteristic section 160 determines the transfer function from the inertia moment J and the viscosity coefficient C in accordance with the above Equation 6, and the target steering angular velocity $\omega_0$ is calculated by multiplying the target steering angular velocity $\omega_3$ with the transfer function and is outputted from the steering system characteristic section 160. The target steering angular velocity $\omega_0$ is adding-inputted into the subtracting section 103. The steering angular velocity ω is subtracting-inputted into the subtracting section 103. The deviation SG1 between the target steering angular velocity $\omega_0$ and the steering angular velocity A is calculated at the subtracting section 103 and is inputted into a multiplying section 132.

Furthermore, the steering torque gain Th that is outputted from the steering torque gain section 110 is inputted into the multiplying section 132 and a limiter 142, and the vehicle speed gain KP from the vehicle speed gain section 130 is also inputted into the multiplying section 132 and the limiter 142.

A handle-returning control gain SG2 (a proportional control value) from the multiplying section 132, which is calculated by multiplying the deviation SG1 with the steering torque gain Th and the vehicle speed gain KP, is inputted into an adding section 104 and an integral control section comprising an integral section 140 for a characteristic improvement and an integral gain section 141, and is further inputted into the limiter 142 via the integral gain section 141. A signal SG4 whose output is limited depending on the steering torque gain Th and the vehicle speed gain KP at the limiter 142, is added to the handle-returning control gain SG2 at the adding section 104, and is outputted as the handle-returning control current HR. The integral at the integral section 140 compensates a low steering torque range that is easily influenced by the friction, and especially the integral is effective in the range that is largely affected by the friction in hands off state. The current command value Iref is added to the handle-returning control current HR at an adding section 105 and is corrected (compensated), and a corrected compensation current command value Irefn is inputted into a motor driving system.

A handle-returning control gain calculating section comprises the subtracting section 103 and the multiplying section 132, a steering system characteristic section comprises the viscosity coefficient outputting section 133, the steering system characteristic section 1 (150) and the steering system characteristic section 2 (160), and a handle-returning control current calculating section comprises the integral section 140, the integral gain section 141, the limiter 142 and the adding section 104.

Figure 4:
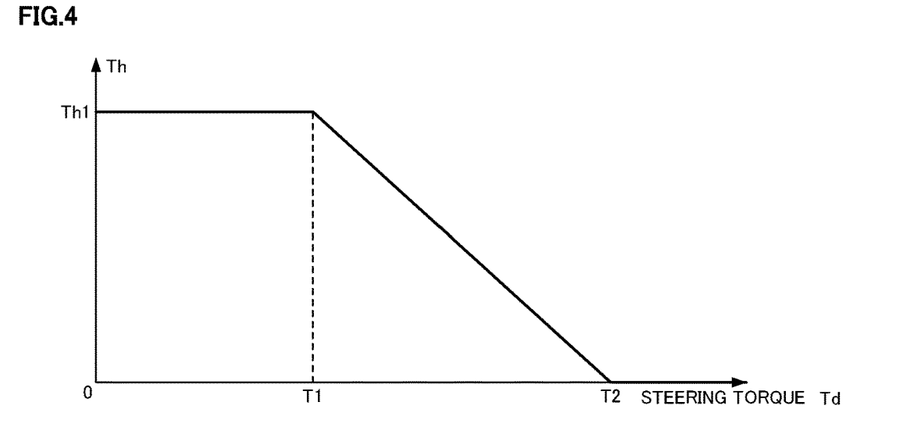
FIG. 4 is a characteristic diagram showing an output gain example of a steering torque gain section.

The steering torque gain section 110 has a characteristic as shown in FIG. 4, outputs a constant value gain Th1 when the steering torque Td is from zero to T1, and has an output characteristic that the gain gradually decreases when the steering torque Td is larger than T1 and the gain is zero when the steering torque Td is equal to or larger than T2. In FIG. 4, although the steering torque gain Th linearly decreases, the gain may nonlinearly decrease.

Figure 5A:
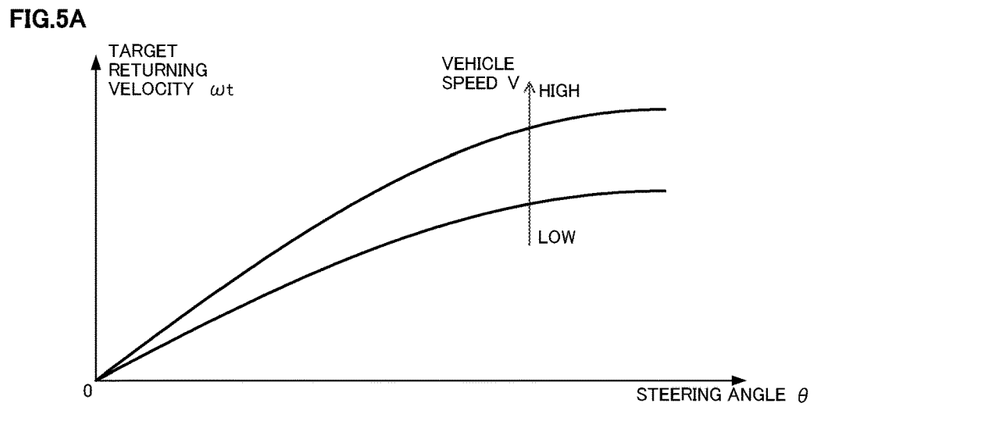
FIG. 5A and FIG. 5B are characteristic diagrams showing output examples of a target returning velocity calculating section.
Figure 5B:
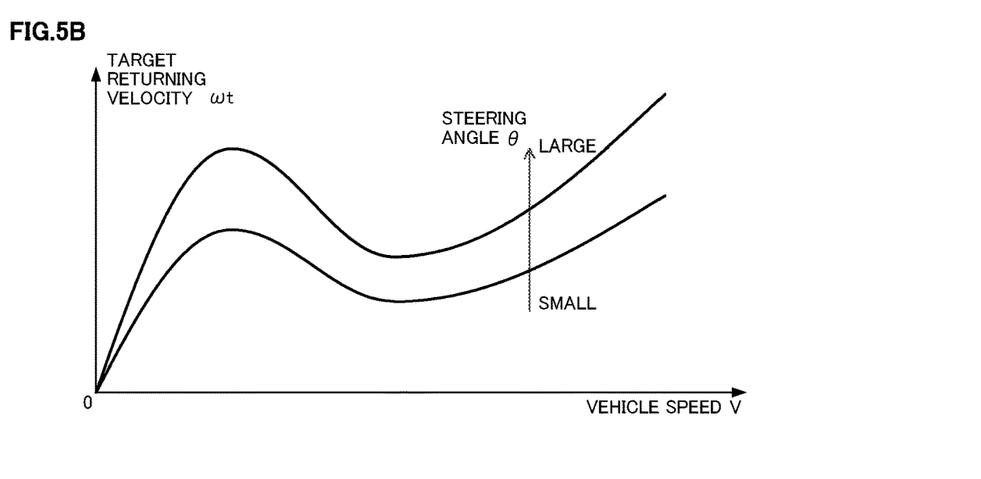

Further, the target returning velocity calculating section, in which the vehicle speed V serves as a parameter, has an output characteristic that the target returning velocity $\omega t$ gradually increases when the steering angle $\theta$ is larger, as shown in FIG. 5A. As shown in FIG. 5B, the target returning velocity $\omega t$ varies with the output characteristic that the target returning velocity $\omega t$ does not gradually increase when the vehicle speed V is higher.

Figure 6:
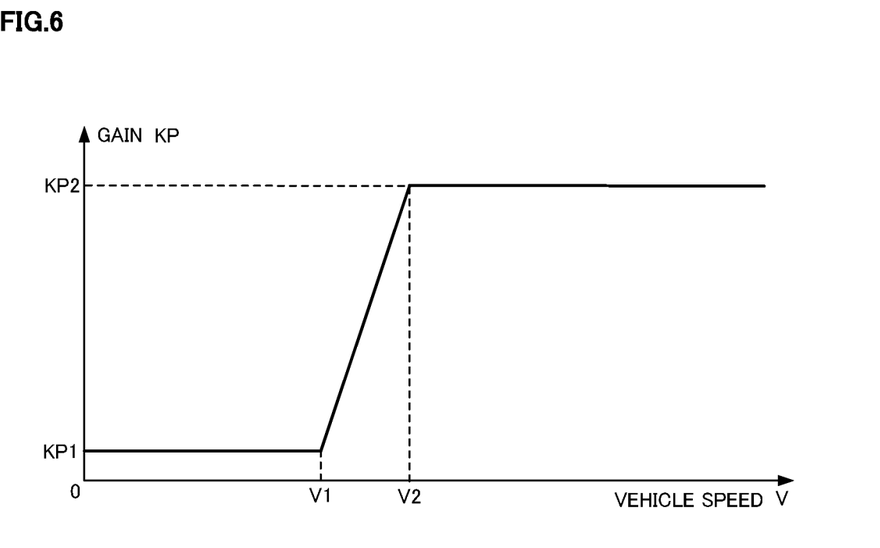
FIG. 6 is a characteristic diagram showing an output example of the vehicle speed gain section.

The vehicle speed gain section 130 has a characteristic as shown in FIG. 6 that the gain KP is a small constant gain KP1 when the vehicle speed V is from zero to at least V1, gradually increases when the vehicle speed V is equal to or higher than V1, and is a large constant gain KP2 when the vehicle speed V is equal to or higher than V2. However, the characteristic of the gain KP is not limited to such a characteristic.

Figure 7:
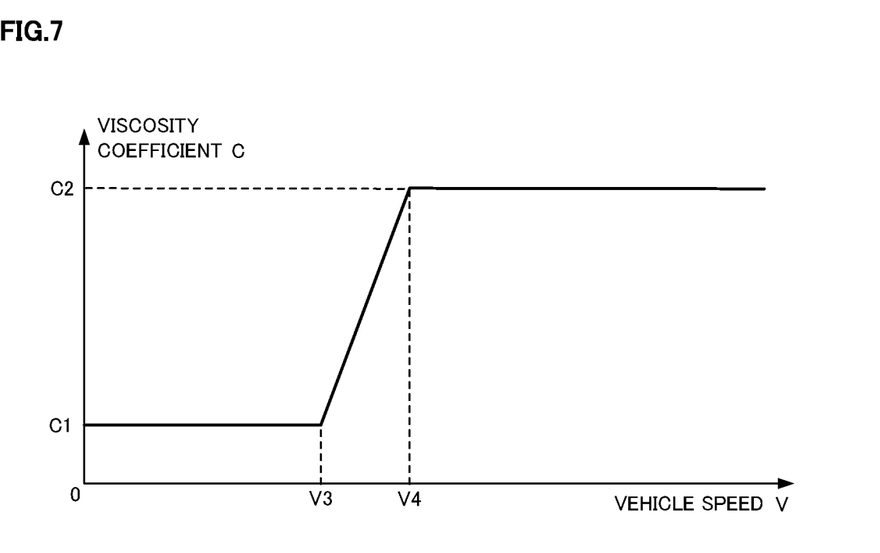
FIG. 7 is a characteristic diagram showing an output example of a viscosity coefficient outputting section.

Furthermore, the viscosity coefficient outputting section 133, in which the viscosity coefficient C depending on the vehicle speed V is changeable, has a characteristic as shown in FIG. 7 that the viscosity coefficient C is a small constant viscosity coefficient C1 when the vehicle speed V is from zero to at least V3, gradually increases when the vehicle speed V is equal to or higher than V3 and is equal to or slower than V4 (>V3), and is a large constant viscosity coefficient C2 when the vehicle speed V is equal to or higher than V4. However, the characteristic of the viscosity coefficient C is not also limited to such a characteristic.

Figure 8:
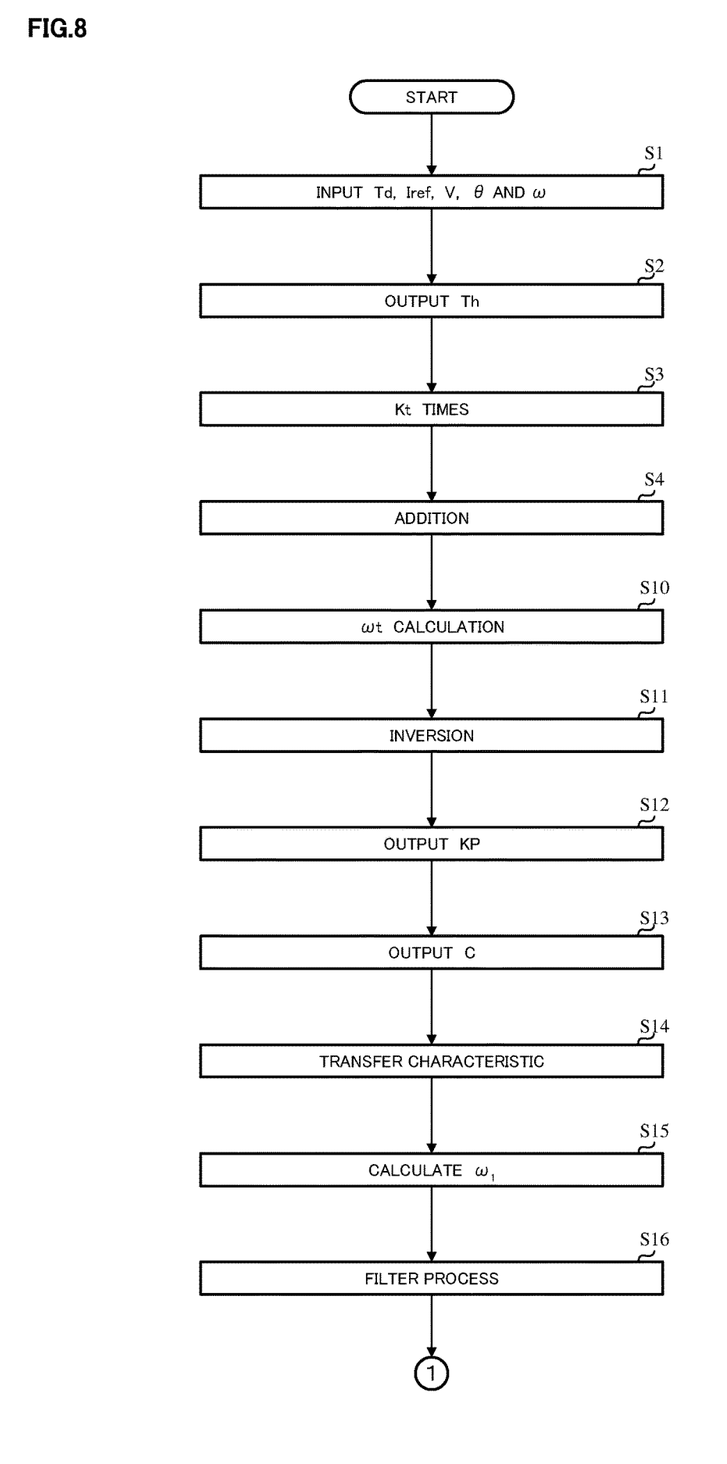
FIG. 8 is a part of a flowchart showing an operation example of the present invention.
Figure 9:
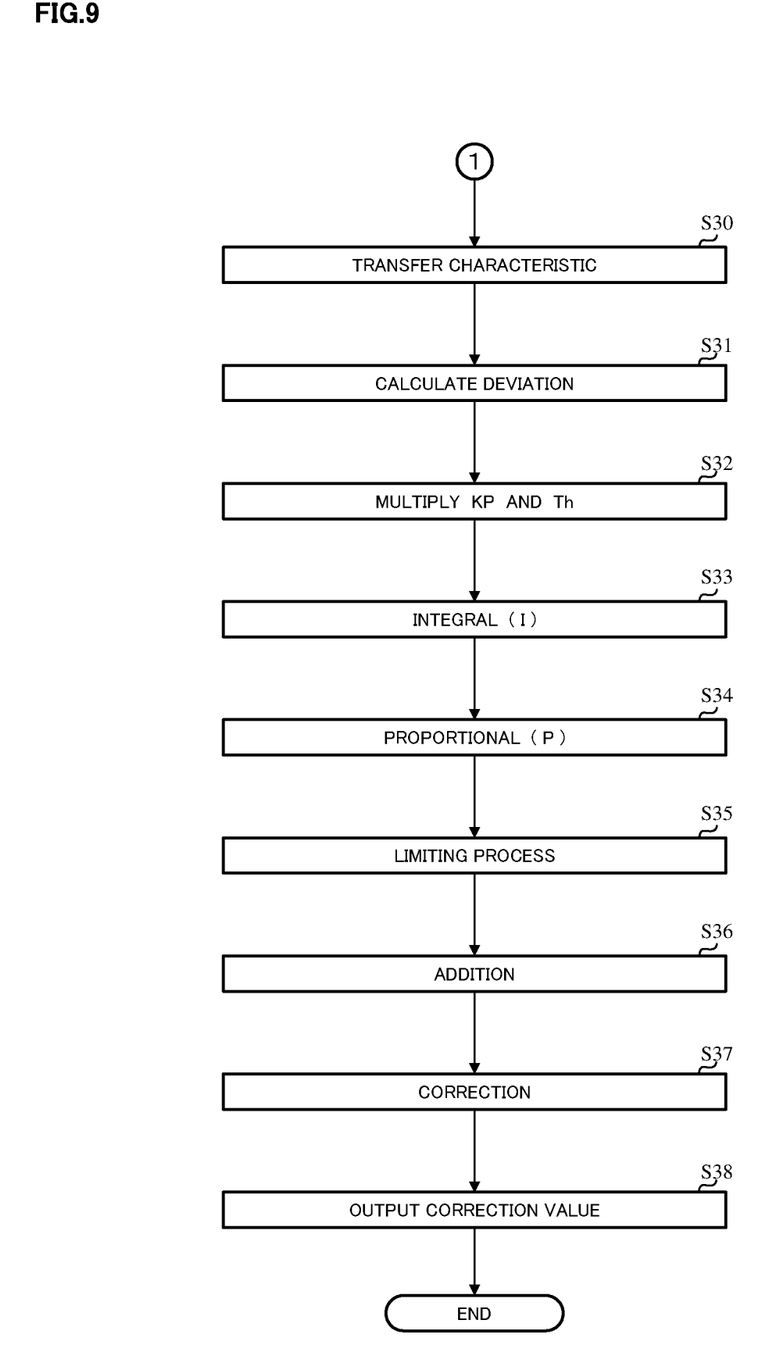
FIG. 9 is another part of a flowchart showing an operation example of the present invention.

In such a configuration, the operation example will be described with reference to flowcharts of FIG. 8 and FIG. 9.

At first, the steering torque Td, the current command value Iref, the vehicle speed V, the steering angle $\theta$ and the steering angular velocity $\omega$, are inputted (read) (Step S1), and the steering torque gain section 110 outputs the steering torque gain Th (Step S2). The gain section 111 calculates the assist torque Ta by multiplying the current command value Iref with the gain Kt (Step S3) and the steering torque Td is added to the assist torque Ta at the adding section 102. The sum value is inputted into the steering system characteristic section 1 (150) (Step S4).

Further, the target returning velocity calculating section 120 calculates the target returning velocity $\omega t$ based on the inputted steering angle $\theta$ and vehicle speed V (Step S10), the inverting section 121 performs a sign inversion of the target returning velocity $\omega t$ (Step S11) and the inverted target returning velocity "$-\omega t$" is inputted into the adding section 101 and is added to the target velocity value $\omega_2$. The vehicle speed gain section 130 outputs the vehicle speed gain KP in accordance with the vehicle speed V (Step S12) and the viscosity coefficient outputting section 133 outputs the viscosity coefficient C in accordance with the vehicle speed V (Step S13). The viscosity coefficient C is inputted into the steering system characteristic section 150 (Step S14), the above sum value is multiplied with the transfer characteristic "1/C" and the multiplied result is outputted as the target velocity value $\omega_1$ (Step S15). The target velocity value $\omega_1$ is inputted into the LPF 151 and is filter-processed (Step S16).

The target velocity value $\omega_2$ that is filter-processed at the LPF 151 is added to the target returning velocity "$-\omega t$" at the adding section 101 and the added target velocity value $\omega_3$ is inputted into the steering system characteristic section 160 (Step S30). The target steering angular velocity $\omega_0$ from the steering system characteristic section 160 is adding-inputted into the subtracting section 103, the actual steering angular velocity $\omega$ is subtracting-inputted into the subtracting section 103 and the deviation SG1 is calculated at the subtracting section 103 (Step S31). The deviation SG1 is inputted into the multiplying section 132 and is multiplied with the steering torque gain Th and the vehicle speed gain KP (Step S32). The handle-returning control gain SG2 is calculated by the above multiplication. The handle-returning control gain SG2 is integral-processed at the integral section 140 (Step S33) and further is proportional-processed at the integral gain section 141 (Step S34), and then a handle-returning control gain SG3 is outputted. The handle-returning control gain SG3 is inputted into the limiter 142 and is limiting-processed at the limiter 142 by using the steering torque gain Th and the vehicle speed gain KP (Step S35).

A handle-returning control gain SG4 that is limiting-processed at the limiter 142 is inputted into the adding section 104 and is added to the handle-returning control gain SG2 (Step S36), and then the handle-returning control current HR is outputted. The handle-returning control current HR is added to the current command value Iref at the adding section 105 and is corrected (Step S37), and then the compensation current command value Irefn is outputted (Step S38).

It is also possible to calculate the steering angular velocity $\omega$ by multiplying a motor angular velocity with a gear ratio, and the transfer characteristic of the virtual steering system model may be changeable depending on the vehicle speed, the steering angle, steering-forward, steering-backward and a steering holding state. Orders of data inputting, calculations and processes in FIG. 8 and FIG. 9 are appropriately changeable.

Figure 10:
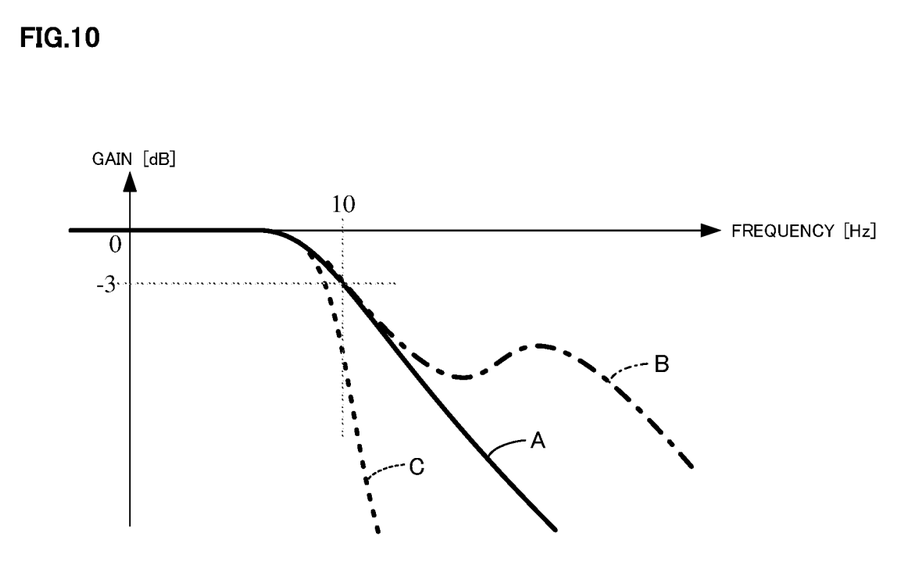
FIG. 10 is a gain diagram showing a characteristic example of a filter.

A frequency characteristic of the LPF 151 which is used in the present invention may has an attenuation of 3 [dB] or more at 10 [Hz], as shown in FIG. 10. The frequency characteristic of the LPF 151 is not limited to a characteristic "A", and may be a characteristic "B" or "C".

EXPLANATION OF REFERENCE NUMERALS 1 handle
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
35 PI-control section
36 PWM-control section
37 inverter
50 CAN
100 handle-returning control section
110 steering torque gain section
111 gain section
120 target returning velocity calculating section
121 inverting section
130 vehicle speed gain section
133 viscosity coefficient outputting section
140 integral section
141 integral gain section
142 limiter
150 steering system characteristic section (1/C)
151 low pass filter (LPF)
160 steering system characteristic section (1/(J/Cs+1))

The invention claimed is:

1. An electric power steering apparatus that calculates a current command value based on at least a steering torque, drives a motor based on said current command value and assist-controls a steering system by means of driving-control of said motor, comprising:
   a handle-returning control section which calculates a target steering angular velocity for a handle-returning by using said steering torque, said current command value, a vehicle speed and a steering angle, and
calculates a handle-returning control current based on a deviation between a steering angular velocity and said target steering angular velocity; and interposes a filter, which attenuates frequency components which are equal to or higher than a steering input or which are equal to or higher than vehicle motion characteristics based on said steering input, in a calculation path of said target steering angular velocity,
wherein said motor is driven by correcting said current command value by means of said handle-returning control current.

2. The electric power steering apparatus according to claim 1, wherein said handle-returning control section comprises:
   a target returning velocity calculating section to calculate a target returning velocity based on said steering angle and said vehicle speed;
   a steering torque gain section to calculate a steering torque gain based on said steering torque;
   a viscosity coefficient outputting section to calculate a viscosity coefficient of said steering system based on said vehicle speed;
   a vehicle speed gain section to calculate a vehicle speed gain based on said vehicle speed;
   a first steering system characteristic section to calculate a first target velocity value from an adding value of said steering torque and an assist torque which is a value being multiplied said current command value by a gain and said viscosity coefficient;
   said filter to filter-process said first target velocity value;
   a second steering system characteristic section to input a third target velocity value which is obtained by correcting said target returning velocity with a second target velocity value from said filter, and to calculate said target steering angular velocity from said viscosity coefficient and an inertia moment of said steering system;
   a handle-returning control gain calculating section to calculate a handle-returning control gain by multiplying a deviation between said target steering angular velocity and said steering angular velocity with said vehicle speed gain and said steering torque gain; and
   a handle-returning control current calculating section to calculate a handle-returning control current by performing at least one control calculation of a proportional control calculation, an integral control calculation and a differential control calculation to said handle-returning control gain, and output-limiting said calculated handle-returning control gain by means of said vehicle speed gain and said steering torque gain.

3. The electric power steering apparatus according to claim 2, wherein said filter is a low pass filter and a filter characteristic has an attenuation which is equal to or more than 3 dB at 10 Hz.

4. The electric power steering apparatus according to claim 1, wherein said filter is a low pass filter and a filter characteristic has an attenuation which is equal to or more than 3 dB at 10 Hz.

* * * * *